Figure 1:
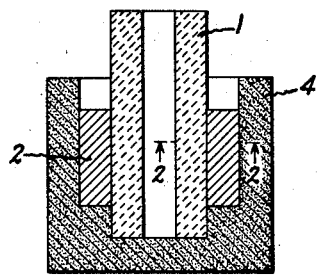

Jan. 21, 1958  G. W. HUME  2,820,534
HERMETIC CERAMIC-METAL SEAL AND METHOD OF MAKING THE SAME
Filed April 22, 1954

Inventor:
George W. Hume,
by Howard S. Schlanker
His Attorney.

United States Patent Office 2,820,534
Patented Jan. 21, 1958

2,820,534

HERMETIC CERAMIC-METAL SEAL AND METHOD OF MAKING THE SAME

George W. Hume, Cohoes, N. Y., assignor to General Electric Company, a corporation of New York Application April 22, 1954, Serial No. 424,900

11 Claims. (Cl. 189—36.5)

My invention relates to a hermetic ceramic-metal seal and a method for preparing such a seal or bond. More particularly the invention relates to a hermetic metal-ceramic seal and a method for hermetically bonding or sealing to a ceramic, metals which have heretofore not been susceptible to such treatment.

The bonding of certain metals to ceramics has been known for some time. One method prescribes the deposition on the surface of the ceramic a metal layer of zirconium or titanium by dissociating thereon zirconium or titanium hydride, said metal layer then being tinned with a solder. Patent 2,570,248—Kelley, assigned to the same assignee as the present invention, describes a process wherein a mixture of metal hydride or hydrides and a solder is used to obtain a metal layer to which another metal may be soldered or bonded. While the prior art processes are useful for bonding many metals to ceramics, I have found that they may not be utilized for producing hermetic gas or vacuum tight bonds or seals between ceramics and such metals as aluminum and magnesium. In these cases there appears to be a defective bonding of the ceramic to the metal layer which precludes a hermetic sealing action. As a result, heretofore an elaborate procedure has been followed in providing a structure in which a ceramic was to be attached to the metals listed above. For example, one method of producing a hermetic aluminum-ceramic structure involves the use of a number of metals between the ceramic itself and the aluminum in order that a gastight seal may be realized. In this process a layer of zirconium, titanium, or a mixture of these two metals is prepared on the ceramic in the usual manner. This metal layer is tinned with a copper-silver solder to which in turn is bonded a 42% nickel iron alloy. Copper is then bonded as by welding to the ferro-nickel alloy and aluminum welded to the copper. An aluminum alloy containing a small amount of silicon is then welded to the first aluminum structure. The hermetic seal is provided by welding another aluminum structure to the aluminum-silicon alloy.

An object of my invention is to provide a simple hermetic seal between a ceramic and metal such as aluminum and magnesium.

Briefly stated, my invention consists in forming a layer of a metal such as zirconium, or titanium and the like on a ceramic to which a metal, such as aluminum or magnesium is to be bonded hermetically. Over the first metal layer is placed a layer of a solder such as silver, silver-copper alloy and the like, having a melting point higher than the aluminum or magnesium to be finally bonded thereto, the solder alloys with the layer of zirconium, titanium and the like to form a base metal layer which is firmly bonded to the ceramic. The final metal such as aluminum is then cast and alloyed in situ about, and preferably extending beyond, the base metal layer. The result is hermetic seal between the ceramic and the aluminum or magnesium.

The features of my invention which I believe to be novel are set forth in the claims appended hereto. My invention will, however, be better understood from a consideration of the following description and the drawing in which Fig. 1 shows my invention as applied to a ceramic bushing or sleeve, and Fig. 2 is an enlarged view of a section of the structure of Fig. 1 in the direction 2—2.

Figure 2:
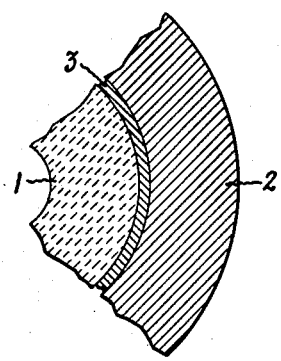

Referring to Fig. 1, there is shown a ceramic bushing or sleeve 1 to which is hermetically bonded a sleeve or ring 2 of aluminum or magnesium, or combinations or alloys thereof.

By the term "ceramic" I intend to encompass the non-metallic refractory materials commonly known by that term as well as glass, porcelain, diamond, graphite and the like.

According to my invention, a zirconium or titanium base metal layer, or a layer of alloys of such metals or mixtures thereof, is first placed on the cleaned ceramic, the extent of the layer being such that its edge will preferably be overlapped by the final cast metal structure. This may be done in any of a number of ways. For instance, a metallic hydride such as that of titanium or zirconium, or mixtures or alloys thereof may be placed in powdered form on the desired part and dissociated in the usual manner to leave a metallic layer which wets and is bonded to the ceramic when a solder wets and is alloyed with the titanium or zirconium. It is perhaps more convenient to make a suspension of the metallic hydride in a binder and solvent, which suspension is painted on the ceramic to be metallized. Such a suitable suspension may be made by mixing materials in the proportions of three or four grams of metallic hydride to one to two drops of a cellulose nitrate lacquer and about two to three cubic centimeters of a solvent such as amyl acetate. The resultant suspension is then applied in a continuous film to the ceramic as with a brush or other convenient means, a layer about one mil thick being adequate. The ceramic-metal hydride combination is then placed in a vacuum or atmosphere which will not react with the hydride such as hydrogen, helium, or argon. The hydride is typically heated to over 500° C. for several minutes, it being understood that higher temperatures may be used and that the heating cycle is of the time-temperature type. However, the above metal hydrides dissociate at about 500° C. The above treatment leaves a first metallic layer of zirconium or titanium, or an alloy of these two metals or of one of them on the ceramic base, depending on the starting material. Only that part of the ceramic actually coated by the hydride is metallized, there being no creeping or spreading of the metal beyond the original extent of the hydride.

The succeeding layer which consists of a silver, silver-copper alloy, or any other common solder having a melting point higher than that of the aluminum or magnesium to be finally bonded is also placed on the first metal layer. This solder layer alloys with the zirconium or titanium layer to form a base metal layer 3. Such solders are well known to those skilled in the art. This solder layer is conveniently melted over the first metal layer during the formation of the latter. In this case a ring of solder is fixed around the vertically positioned ceramic just above that portion which is covered by the metal hydride. Under heat of about 500° C. or more the hydride dissociates leaving a first metal layer over which the ring of solder melts as the temperature of the assembly is raised to form a base metal layer which is an alloy of the solder and the first metal layer of zirconium, titanium, and the like.

In casting the aluminum or magnesium to the ceramic or to the base metal layer 3 on the ceramic, a retaining boat or form 4 is prepared and placed about the ceramic part to retain the molten metal. Form 4 is typically of carbon which is preferably de-gassed before using by any of the well-known methods. A piece of the metal to be bonded here shown as a ring 2 is placed in the fitted form, care being preferably taken that the bonding metal ring extends beyond the edges of the solder and base metal layers. The assembly is then heated in a vacuum or inert atmosphere such as that of helium or argon until the aluminum or other metal is melted and alloys with the tinned ceramic surface. In the case of aluminum, heating to a temperature of about 660° to 750° C. suffices, although the melting cycle is again of the time-temperature relationship. However, care must be taken that such a high temperature is not used as will cause any of the metal to vaporize to any appreciable extent. For example, aluminum will vaporize at about 800° C. in a vacuum. The assembly is cooled in the vacuum or inert gas. The carbon form 4 is removed from the assembly, leaving a ceramic base 1 to which is firmly and hermetically bonded or sealed a metal structure 2 of aluminum or magnesium. Inasmuch as the bonded metal 2 extends beyond the base metal layer and inasmuch as the metal used has a greater coefficient of expansion than the ceramic base, the bonded metal structure compresses against the ceramic, effectively preventing the entrance of moisture under the bonded metal structure which might cause galvanic corrosion. If there is no need in a particular application to guard against galvanic action, the cast metal need not overlap the base metal layer. It has been found that the technique of casting the metal to be bonded on the ceramic provides an absolutely hermetic or gas tight seal between the ceramic and the bonded metal structure which is useful in those applications where such a hermetic or gas tight seal is essential. This hermetically sealed structure is not feasible with the materials described other than by casting the metal on the ceramic as described above.

While the preceding example has been set forth with reference to the use of aluminum as the metal to be bonded to the ceramic, it will be understood that magnesium may be used in lieu of aluminum, due allowance being made in the process for any differences between its melting point and vaporizing characteristic and those of aluminum.

I intend to protect by the following claims all modifications of my invention which do not depart from the scope and spirit thereof.

What I claim as new and desire to secure by Letters Patent of the United States is:

1. A hermetically sealed ceramic-metal structure comprising a ceramic, a layer thereon of an alloy of (1) a metal chosen from the group consisting of zirconium and titanium and combinations and alloys thereof, and of (2) solder and a cast metal on said alloy layer, said cast metal being chosen from the group consisting of aluminum and magnesium, and mixtures and alloys thereof.

2. A hermetically sealed ceramic-metal structure comprising a ceramic, a layer thereon of an alloy of (1) a metal chosen from the group consisting of zirconium and titanium and combinations and alloys thereof, and (2) a solder and a cast metal on said alloy layer, said cast metal being chosen from the group consisting of aluminum and magnesium, and mixtures and alloys thereof, said solder having a melting point higher than that of said cast metal.

3. The method of hermetically bonding a metal selected from the group consisting of aluminum and magnesium, and combinations and alloys of such metals to a ceramic which comprises applying to the ceramic a first metal selected from the group consisting of zirconium, titanium, and mixtures and alloys thereof, applying to said first metal a solder having a melting point higher than that of said metal to be bonded, and casting the metal to be bonded to said ceramic to the metallized portion of said ceramic.

4. The method of hermetically bonding a metal selected from the group consisting of aluminum and magnesium, and combinations and alloys of such metals to a ceramic which comprises metallizing the ceramic with zirconium, applying to said zirconium a solder having a melting point higher than that of said metal to be bonded and casting the metal to be bonded to said ceramic to the metallized portion of said ceramic.

5. The method of hermetically bonding a metal selected from the group consisting of aluminum and magnesium, and combinations and alloys of such metals to a ceramic which comprises metallizing the ceramic with titanium, applying to said titanium a solder having a melting point higher than that of said metal to be bonded and casting the metal to be bonded to said ceramic to the metallized portion of said ceramic.

6. The method of hermetically bonding aluminum to a ceramic which comprises applying to the ceramic a first metal selected from the group consisting of zirconium, titanium, and mixtures and alloys thereof, applying to said first metal a solder having a melting point higher than that of said metal to be bonded to said ceramic to the metallized portion of said ceramic, and casting the aluminum to be bonded to said ceramic to the metalized portion of said ceramic.

7. The method of hermetically bonding aluminum to a ceramic which comprises applying zirconium to the ceramic, applying to said zirconium a solder having a melting point higher than that of said metal to be bonded and casting the metal to be bonded to said ceramic to the metallized portion of said ceramic.

8. The method of hermetically bonding aluminum to a ceramic which comprises applying titanium to the ceramic, applying to said titanium a solder having a melting point higher than that of said metal to be bonded and casting the metal to be bonded to said ceramic to the metallized portion of said ceramic.

9. The method of hermetically bonding magnesium to a ceramic which comprises applying to the ceramic a first metal selected from the group consisting of zirconium, titanium, and mixtures and alloys thereof, applying to said first metal a solder having a melting point higher than that of said metal to be bonded, and casting the metal to be bonded to said ceramic to the metallized portion of said ceramic.

10. The method of hermetically bonding magnesium to a ceramic which comprises applying zirconium to the ceramic, applying to said zirconium a layer of solder having a melting point higher than that of said metal to be bonded and casting the metal to be bonded to said ceramic to the metallized portion of said ceramic.

11. The method of hermetically bonding magnesium to a ceramic which comprises applying titanium to the ceramic, applying to said titanium a layer of solder having a melting point higher than that of said metal to be bonded and casting the metal to be bonded to said ceramic to the metallized portion of said ceramic.

References Cited in the file of this patent

UNITED STATES PATENTS

| | | |
|---|---|---|
| 2,235,680 | Haven | Mar. 18, 1941 |
| 2,292,026 | Gillett | Aug. 4, 1942 |
| 2,351,798 | Alexander | June 20, 1944 |
| 2,454,270 | Braunsdorff | Nov. 23, 1948 |
| 2,509,020 | Stauffer | May 23, 1950 |
| 2,521,845 | Gregory | Sept. 12, 1950 |
| 2,570,248 | Kelley | Oct. 9, 1951 |
| 2,686,958 | Eber | Aug. 24, 1954 |